(12) United States Patent
Sokolov

(10) Patent No.: US 6,918,109 B2
(45) Date of Patent: Jul. 12, 2005

(54) EXECUTION OF SYNCHRONIZED JAVA METHODS IN JAVA COMPUTING ENVIRONMENTS

(75) Inventor: Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 604 days.

(21) Appl. No.: 10/000,552

(22) Filed: Oct. 24, 2001

(65) Prior Publication Data

US 2003/0079203 A1 Apr. 24, 2003

(51) Int. Cl.[7] .................................................. G06F 9/45
(52) U.S. Cl. ........................ 717/139; 717/127; 717/118
(58) Field of Search ................................. 717/116, 118, 717/127, 139–140, 147–148

(56) References Cited

U.S. PATENT DOCUMENTS

| | | | | |
|---|---|---|---|---|
| 5,862,376 | A | 1/1999 | Steele, Jr. et al. | 718/107 |
| 6,167,424 | A | 12/2000 | Bak et al. | 718/100 |
| 6,173,442 | B1 | 1/2001 | Agesen et al. | 717/141 |
| 6,314,563 | B1 * | 11/2001 | Agesen et al. | 717/108 |
| 6,317,872 | B1 * | 11/2001 | Gee et al. | 717/152 |
| 6,567,974 | B1 * | 5/2003 | Czajkowski | 717/151 |
| 6,681,385 | B1 * | 1/2004 | Steensgaard et al. | 717/133 |
| 6,701,517 | B1 * | 3/2004 | Moore et al. | 717/121 |
| 6,735,760 | B1 * | 5/2004 | Dice | 717/139 |
| 6,757,891 | B1 * | 6/2004 | Azagury et al. | 717/158 |

FOREIGN PATENT DOCUMENTS

EP        0955584 A2        11/1999

OTHER PUBLICATIONS

Bacon et al. Thin Locks: Featherweight Synchronization for Java. ACM. 1998. pp. 258–268.*
Blomdell. Effcient Java Monitors. IEEE. 2001. pp. 270–276.*
Lindholm et al., "The Java™ Virtual Machine Specification," (Sept, 1996), Sun Microsystems, Inc., Chapters 1–10 (173 pp.).

* cited by examiner

Primary Examiner—Wei Y. Zhen
(74) Attorney, Agent, or Firm—Beyer Weaver & Thomas, LLP

(57) ABSTRACT

Techniques for executing synchronized Java methods are disclosed. As such, the techniques can be implemented in a Java virtual machine to efficiently execute Java instructions. As will be appreciated, monitors (e.g., locks) associated with Java objects for which the synchronized method are being performed are accessed quickly. In other words, the monitors can be quickly released without having to repeat several time-consuming operations which have to be performed in conventional systems. This, in turn, reduces the number of operations that need to be performed to execute synchronized Java methods. As a result, the performance of virtual machines, especially those operating with limited resources, is improved.

21 Claims, 5 Drawing Sheets

EXECUTION OF SYNCHRONIZED JAVA METHODS IN JAVA COMPUTING ENVIRONMENTS

BACKGROUND OF THE INVENTION

The present invention relates generally to Java programming environments, and more particularly, to frameworks for execution of synchronized Java methods in Java programming environments.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet that allows communication between diverse computer platforms through a graphical interface. Computers communicating over the Web are able to download and execute small applications called applets. Given that applets may be executed on a diverse assortment of computer platforms, the applets are typically executed by a Java virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed, without modification, on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification Second Edition*, by Tim Lindholm and Frank Yellin, which is hereby incorporated herein by reference.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The methods portion 108 can include, or have references to, several Java methods associated with the Java class which is represented in the class file 100. Some of these methods can be synchronized methods. A synchronized method typically requires a monitor (e.g., software lock) to be acquired before synchronized the synchronized method is executed. The monitor is then released after the synchronized method is executed (i.e., upon return from the synchronized method).

One problem with conventional techniques for executing synchronized Java methods is that several operations have to be performed in order to execute the synchronized Java methods. Moreover, these operations are performed once when the monitor is acquired and then have to be repeated again in order to release the monitor. Accordingly, it is highly desirable to reduce the overhead associated with execution of synchronized Java methods. This, in turn, can improve the performance of virtual machines, especially those operating with limited resources.

In view of the foregoing, improved frameworks for execution of synchronized Java methods are needed.

SUMMARY OF THE INVENTION

Broadly speaking, the improved techniques for executing synchronized Java methods are disclosed. As such, the techniques can be implemented in a Java virtual machine to efficiently execute Java instructions. As will be appreciated, the invention can be implemented to quickly accesses monitors (e.g., locks) associated with Java objects and their synchronized methods. In other words, monitors can be released without having to repeat several time-consuming operations which are be performed in conventional systems. This, in turn, reduces the number of operations that need to be performed to execute synchronized Java methods. As a result, the performance of virtual machines, especially those operating with limited resources, is improved.

The invention can be implemented in numerous ways, including as a method, an apparatus, a computer readable medium, and a database system. Several embodiments of the invention are discussed below.

As a method for executing a synchronized Java method, one embodiment of the invention includes the acts of: invoking a synchronized Java method, searching for a monitor associated with the synchronized Java method, acquiring the monitor associated with the synchronized Java method after the search has been performed, storing information about the monitor after the search has been performed, the information suitable for accessing the monitor, executing the synchronized Java method after the monitor has been acquired, and releasing the monitor using the stored information after the synchronized method has been executed. As will be appreciated, thereby allowing the monitor to be released without performing the searching for the monitor.

As a Java virtual machine suitable for executing a synchronized Java method, the Java virtual machine operates to invoke a synchronized Java method, search for a monitor associated with the synchronized Java method, acquire the monitor associated with the synchronized Java method after the search has been performed, store information about the monitor after the search has been performed, the information suitable for accessing the monitor, execute the synchronized Java method after the monitor has been acquired, and release the monitor using the stored information after the synchronized method has been executed, thereby allowing the monitor to be released without performing the searching for the monitor.

As a method for executing a synchronized Java method, one embodiment of the invention includes the acts of: invoking a synchronized Java method, popping a reference to a Java object from a Java execution stack, determining which hash table has a reference to a monitor associated with the Java object, searching a hash table for the monitor associated with the synchronized Java method using an object identifier as a key, the hash table being identified by the searching, the object identifier identifying the Java object, acquiring the monitor associated with the synchronized Java method after the search has been performed, pushing a reference to the monitor on a Java execution stack, executing the synchronized Java method after the monitor has been acquired, popping the reference from the Java execution stack, and releasing the monitor using the reference after the reference has been popped from the Java execution stack, thereby allowing the monitor to be released without performing the searching for the monitor.

As a computer readable media including computer program code for executing a synchronized Java method, the computer readable media comprising: computer program code for invoking a synchronized Java method, computer program code for searching for a monitor associated with the synchronized Java method, computer program code for acquiring the monitor associated with the synchronized Java method after the search has been performed, computer program code for storing information about the monitor after the search has been performed, the information suitable for accessing the monitor, computer program code for executing the synchronized Java method after the monitor has been acquired, and computer program code for releasing the monitor using the stored information after the synchronized method has been executed, thereby allowing the monitor to be released without performing the searching for said monitor.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to improve performance in Java compliant virtual machines.

To achieve this and other objects of the invention, improved techniques for executing synchronized Java methods are disclosed. As such, the techniques can be implemented in a Java virtual machine to efficiently execute Java instructions. As will be appreciated, the invention can be implemented to quickly accesses monitors (e.g., locks) associated with Java objects and their synchronized methods. In other words, monitors can be released without having to repeat several time-consuming operations which are be performed in conventional systems. This, in turn, reduces the number of operations that need to be performed to execute synchronized Java methods. As a result, the performance of virtual machines, especially those operating with limited resources, is improved.

Embodiments of the invention are discussed below with reference to FIGS. 2–4. However, those skilled in the art will readily appreciate that the detailed description given herein with respect to these figures is for explanatory purposes only as the invention extends beyond these limited embodiments.

Figure 1A:
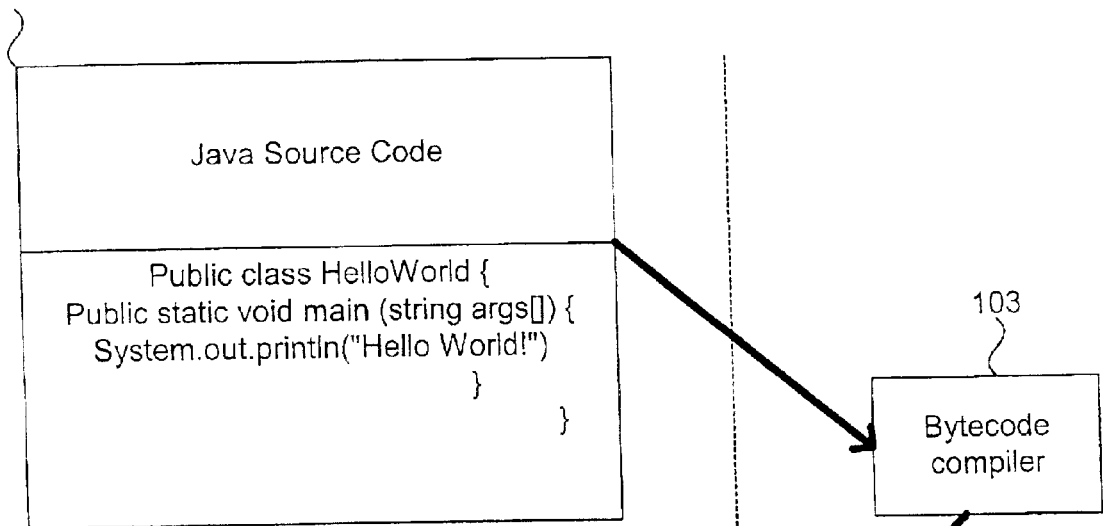
FIG. 1A shows a progression of a simple piece of a Java source code through execution by an interpreter, the Java virtual machine.
Figure 1A:
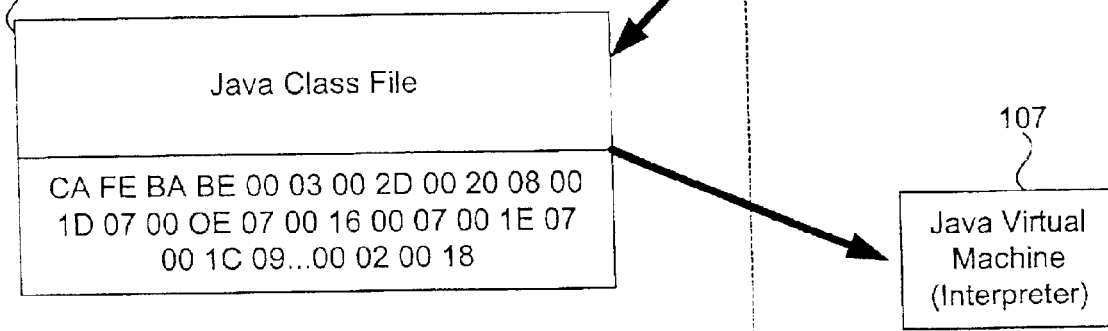
Figure 1B:
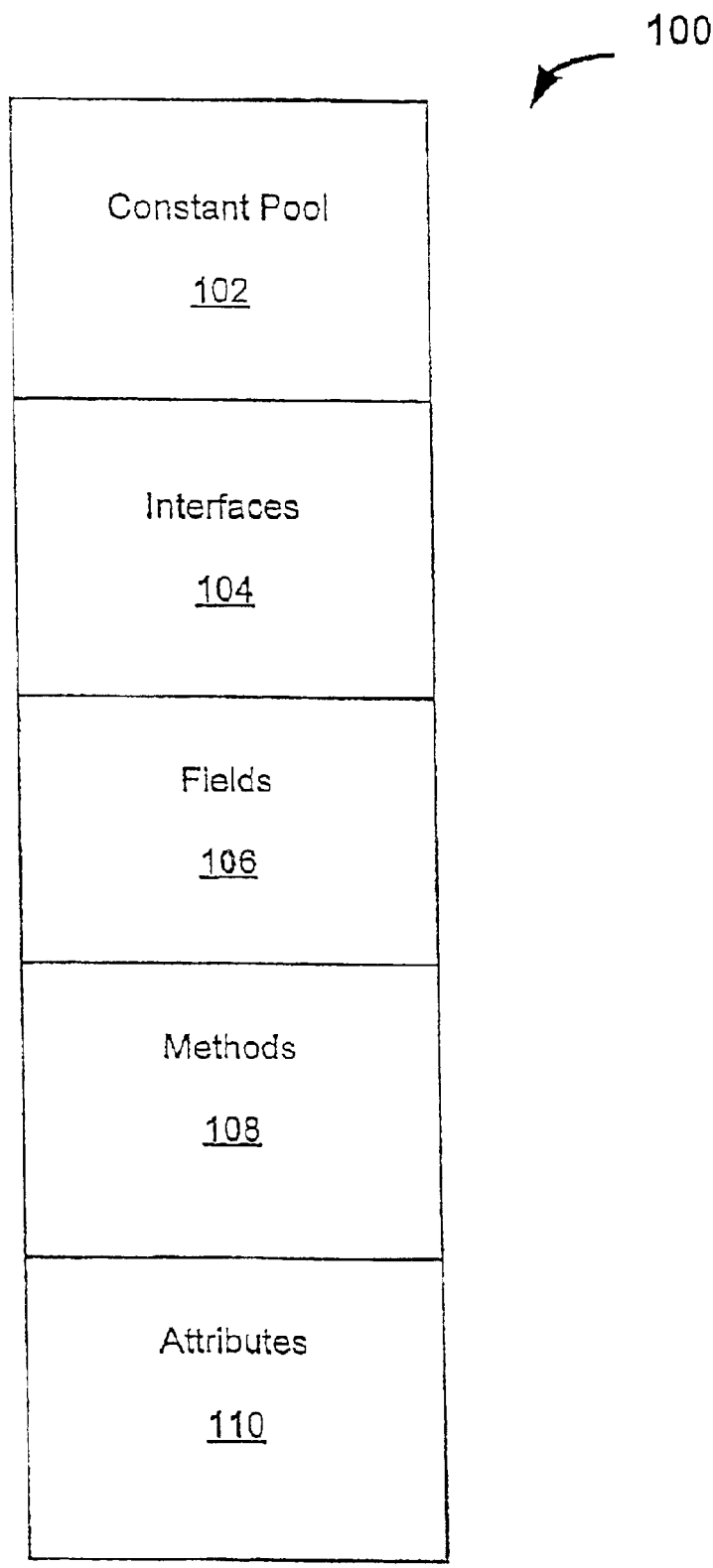
FIG. 1B illustrates a simplified class file.
Figure 2:
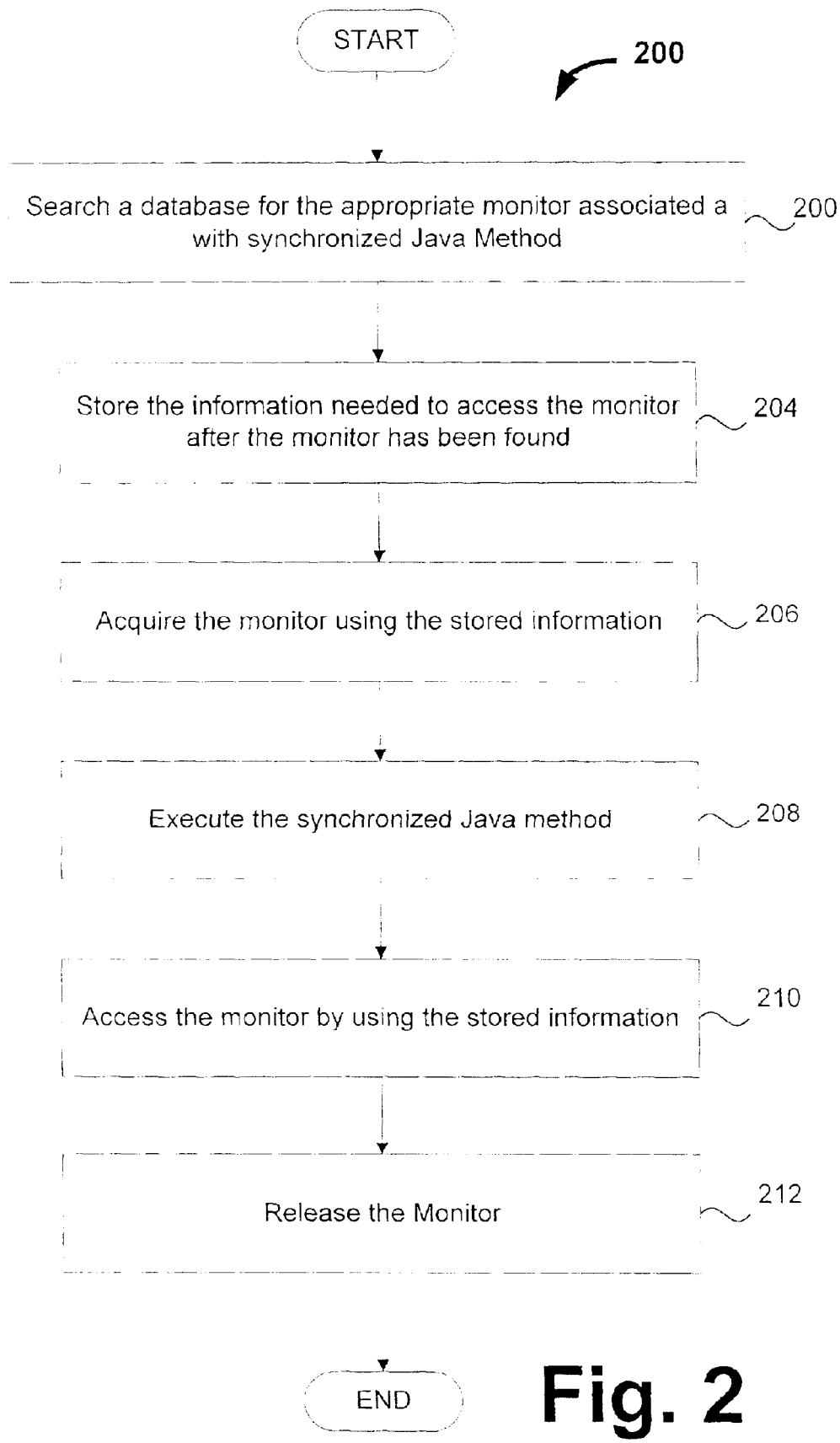
FIG. 2 illustrates a method for executing a synchronized Java method in accordance with one embodiment of the invention.

FIG. 2 illustrates a method 200 for executing a synchronized Java method in accordance with one embodiment of the invention. The method 200 can, for example, be executed by a virtual machine. As will be appreciated, method 200 is especially suitable for use by a virtual machine operating in an embedded system.

Initially, at operation 202, a database is searched for the appropriate monitor associated with the synchronized Java method. Next, at operation 204, the information needed to access the monitor is stored after the monitor has been found. Thereafter, at operation 206, the monitor is acquired using the stored information. After the monitor has been acquired, the synchronized Java method is executed at operation 208. Next, at operation 210, the monitor is accessed using the stored information. Finally, at operation 212, the monitor is released.

Figure 3A:
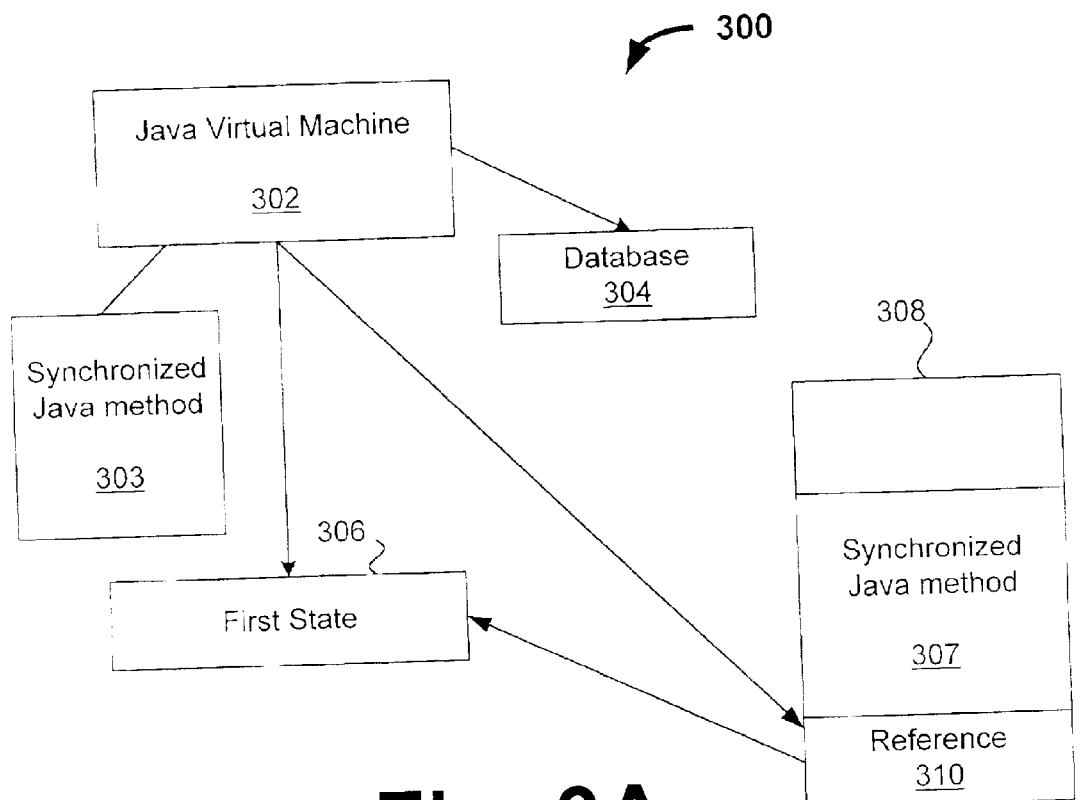
FIGS. 3A–3B illustrate a Java computing environment including a Java virtual machine in accordance with one embodiment of the invention.
Figure 3B:
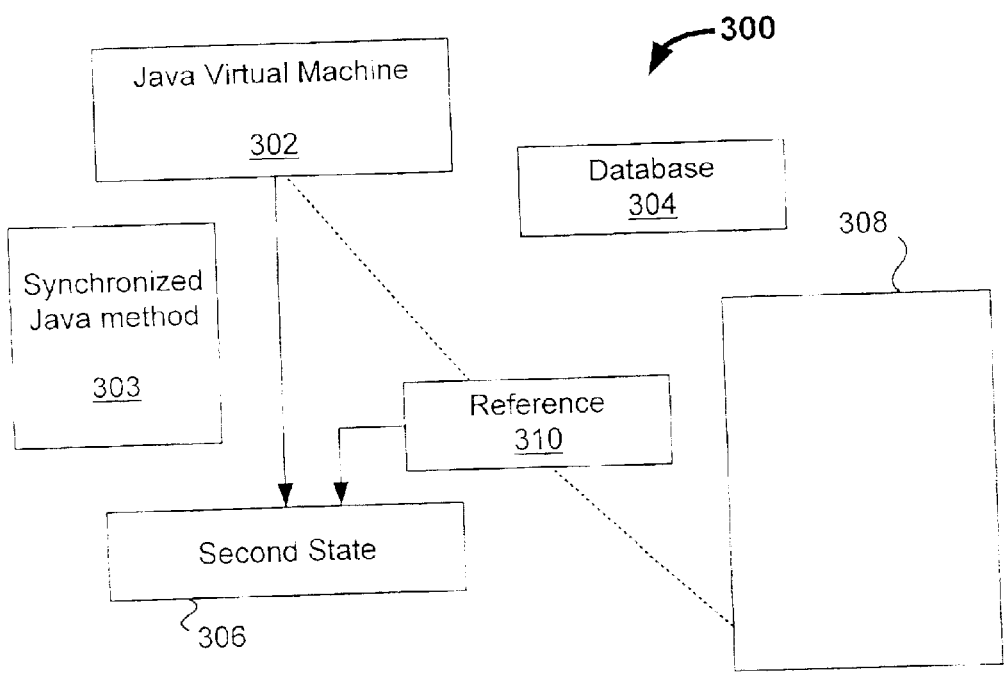

FIGS. 3A–3B illustrate a Java computing environment 300 including a Java virtual machine 302 in accordance with one embodiment of the invention. Referring to FIG. 3A, the Java virtual machine 302 operates to execute a synchronized Java method 303 in the computing environment 300. It should be noted that a stack frame 307 for the synchronized Java method 303 is created and placed on a Java execution stack 308. The Java virtual machine 302 performs a search on a database 304 in order to identify a monitor 306 associated with the synchronized method 303. A reference 310 is then pushed on the Java execution stack 308. The reference 310 can be used to quickly access the monitor 306. The monitor 306 is acquired by setting to a first state. Thereafter, the synchronized Java method 303 can be executed. During the course of the execution of the synchronized Java method 303, the monitor 306 cannot be acquired by another Java method until the monitor 306 is released (i.e., set to a second state).

Referring now to FIG. 3B, the reference 310 is popped from the execution stack 308 after the synchronized Java method 303 has been executed. As will be appreciated, using the reference 310, monitor 306 can quickly be accessed so that it can be released by setting it to a second state. It should be noted that the monitor is released without having to search the database 304. It should also be noted that saving the references on the stack allows quick access to the monitor shortly after the execution of the synchronized method. As a result, the performance of the Java virtual machines, especially those operating in embedded systems, is enhanced.

Figure 4:
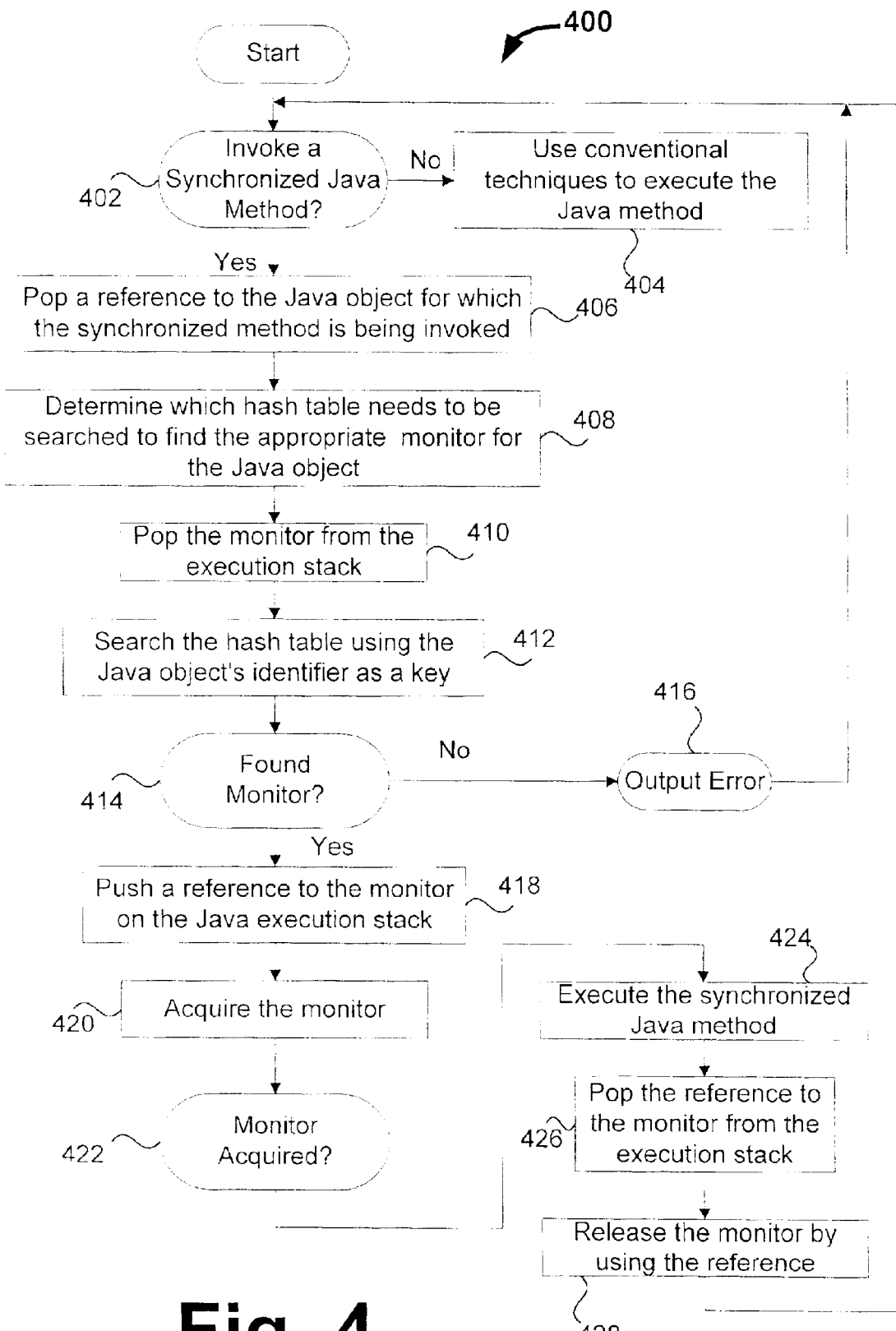
FIG. 4 illustrates a method for executing a synchronized Java method in accordance with another embodiment of the invention.

FIG. 4 illustrates a method for executing a synchronized Java method in accordance with another embodiment of the invention. Initially, at operation 402, a determination is made as to whether a synchronized Java method is being invoked. If it is determined at operation 402 that a synchronized Java method is not being invoked, the method 402 proceeds to operation 404 where conventional techniques can be used to execute the Java method. However, if it is determined at operation 402 that a synchronized Java method is being invoked, the method 402 proceeds to operation 406 where a reference to the Java object for which the synchronized method is being performed is popped from the Java execution stack. Next, at operation 408, it is determined which hash table needs to be searched in order to find the appropriate monitor for the Java object. Thereafter, at operation 412, the hash table is searched using the Java object's identifier as the key. Accordingly, a determination is made at operation 414 where the monitor has been found. If it is determined at operation 414 that the monitor has not been found, the method 400 proceeds to operation 416 where an error message is output. Thereafter, the method 400 proceeds to operation 402 where a determination is made as to whether a synchronized Java method is being performed.

On the other hand, if it is determined at operation 414 that the monitor has been found, the method 400 proceeds to operation 418 where a reference to the monitor is pushed on the Java execution stack. Next, at operation 420, the monitor is acquired. After the monitor has been acquired, the synchronized method is executed at operation 424. Thereafter, at operation 426, the monitor is popped from the Java execution stack. After the reference to the monitor has been popped from the Java execution stack, the monitor can be released using the reference at operation 428. Thereafter, the method 400 proceeds to operation 402 where a determination is made as to whether a synchronized Java method is being performed.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of executing a synchronized Java method, said method comprising:

invoking a synchronized Java method;

searching for a monitor associated with said synchronized Java method;

acquiring said monitor associated with said synchronized Java method after said search has been performed;

storing information about said monitor after said search has been performed, said information suitable for accessing said monitor;

executing said synchronized Java method after said monitor has been acquired; and releasing said monitor using said stored information after said synchronized method has been executed, thereby allowing said monitor to be released without performing said searching for said monitor.

2. A method as recited in claim 1, wherein said method further comprises:

obtaining a reference associated with a Java object, said Java object being an object for which said synchronized Java method is being performed.

3. A method as recited in claim 2, wherein said reference to said Java object is obtained from a Java execution stack.

4. A method as recited in claim 3, wherein said storing of information about said monitor operates to push a reference to said monitor on said Java execution stack.

5. A method as recited in claim 4, wherein said method further comprises:

popping said reference from said execution stack.

6. A method as recited in claim 1, wherein said searching for said monitor comprises:

identifying a hash table associated with a Java object, said Java object being an object for which said synchronized Java method is being performed; and searching said hash table using an identifier associated with said Java object as a key.

7. A method as recited in claim 1, wherein said method is executed in a Java virtual machine.

8. A method as recited in claim 1, wherein said method is executed in a Java virtual machine operating in an embedded system.

9. In a Java computing environment, a Java virtual machine suitable for executing a synchronized Java method, said Java virtual machine operating to:

invoke a synchronized Java method;

search for a monitor associated with said synchronized Java method;

acquire said monitor associated with said synchronized Java method after said search has been performed;

store information about said monitor after said search has been performed, said information suitable for accessing said monitor;

execute said synchronized Java method after said monitor has been acquired; and release said monitor using said stored information after said synchronized method has been executed, thereby allowing said monitor to be released without performing said searching for said monitor.

10. A Java virtual machine as recited in claim 9, wherein said Java virtual machine further operates to:

obtain a reference associated with a Java object, said Java object being an object for which said synchronized Java method is being performed.

11. A Java virtual machine as recited in claim 10, wherein said reference to said Java object is obtained from a Java execution stack.

12. A Java virtual machine as recited in claim 11, wherein said storing of information about said monitor operates to push a reference to said monitor on said Java execution stack.

13. A Java virtual machine as recited in claim 12, wherein said virtual machine operates to:

pop said reference from said execution stack.

14. A Java virtual machine as recited in claim 12, wherein said virtual machine further operates to:

identify a hash table associated with a Java object, said Java object being an object for which said synchronized Java method is being performed; and search said hash table using an identifier associated with said Java object as a key.

15. A Java virtual machine as recited in claim 9, wherein said virtual machine operates in an embedded system.

16. A method of executing a synchronized Java method, said method comprising:

invoking a synchronized Java method;

popping a reference to a Java object from a Java execution stack;

determining which hash table has a reference to a monitor associated with said Java object;

searching a hash table for said monitor associated with said synchronized Java method using an object identifier as a key, said hash table being identified by said searching, said object identifier identifying said Java object;

acquiring said monitor associated with said synchronized Java method after said search has been performed;

pushing a reference to said monitor on a Java execution stack;

executing said synchronized Java method after said monitor has been acquired;

popping said reference from said Java execution stack; and releasing said monitor using said reference after said reference has been popped from said Java execution stack, thereby allowing said monitor to be released without performing said searching for said monitor.

17. A method as recited in claim 16, wherein said method is performed by a Java virtual machine.

18. A method as recited in claim 16, wherein said method is performed by a Java virtual machine operating in an embedded system.

19. A computer readable media including computer program code for executing a synchronized Java method, said computer readable media comprising:

computer program code for invoking a synchronized Java method;

computer program code for searching for a monitor associated with said synchronized Java method;

computer program code for acquiring said monitor associated with said synchronized Java method after said search has been performed;

computer program code for storing information about said monitor after said search has been performed, said information suitable for accessing said monitor;

computer program code for executing said synchronized Java method after said monitor has been acquired; and computer program code for releasing said monitor using said stored information after said synchronized method has been executed, thereby allowing said monitor to be released without performing said searching for said monitor.

20. A computer readable media as recited in claim 19, wherein said computer readable media is read by a Java virtual machine.

21. A computer readable media as recited in claim 20, wherein said computer readable media is read by a Java virtual machine operating in an embedded system.

* * * * *